United States Patent
Brink

[15] 3,636,897
[45] Jan. 25, 1972

[54] APPARATUS FOR PRECISION PLANTING

[72] Inventor: Edwin H. Brink, San Jose, Calif.
[73] Assignee: FMC Corporation, San Jose, Calif.
[22] Filed: Feb. 6, 1969
[21] Appl. No.: 797,061

[52] U.S. Cl. .................................. 111/77, 111/86, 133/1, 221/237
[51] Int. Cl. .......................... A01c 7/16, B65h 5/00
[58] Field of Search .............. 111/77, 86, 85; 221/224, 237, 221/253, 266, 156, 176, 175; 133/1

[56] References Cited

UNITED STATES PATENTS

| | | | |
|---|---|---|---|
| 3,048,132 | 8/1962 | Morgan et al. | 111/77 |
| 3,152,597 | 10/1964 | Rau | 133/1 |
| 3,154,032 | 10/1964 | Kapplemann | 111/77 |
| 3,195,485 | 7/1965 | Reynolds | 111/86 |
| 3,217,674 | 11/1965 | Williams | 111/86 |
| 3,290,860 | 12/1966 | Rau | 133/1 X |
| 3,329,310 | 7/1967 | Ramsay | 221/266 X |
| 3,347,426 | 10/1967 | Morrison et al. | 111/77 |
| 2,684,781 | 7/1954 | Allen et al. | 111/77 X |
| 2,884,880 | 5/1959 | Miller | 111/85 |

*Primary Examiner*—Robert E. Pulfrey
*Assistant Examiner*—Stephen C. Pellegrino
*Attorney*—F. W. Anderson and C. E. Tripp

[57] ABSTRACT

Seeds confined within cylindrical-shaped capsules are planted by opening a furrow in soil, retaining each side of the furrow in an upstanding position, depositing on the bottom of the furrow a seed capsule standing on its circumferential surface with both end surfaces aligned in vertical planes extending lengthwise of the furrow, and releasing both sides of the furrow to slide inward and engage the end surfaces of the seed capsule. Seed capsules are planted in such a manner by a planter that includes an earth traversing frame, a plow suspended from the frame for opening a furrow in soil, a pair of sidewalls extending rearwardly from the plow for retaining each side of the furrow in an upstanding position and defining a chute therebetween through which a seed capsule can be deposited on the bottom of the furrow, means for inserting seed capsules into said chute at intervals in relationship to ground movement of the planter to provide precise spacing between capsules at the bottom of the furrow, and means for orienting and feeding seed capsules to said capsule inserting means.

6 Claims, 10 Drawing Figures

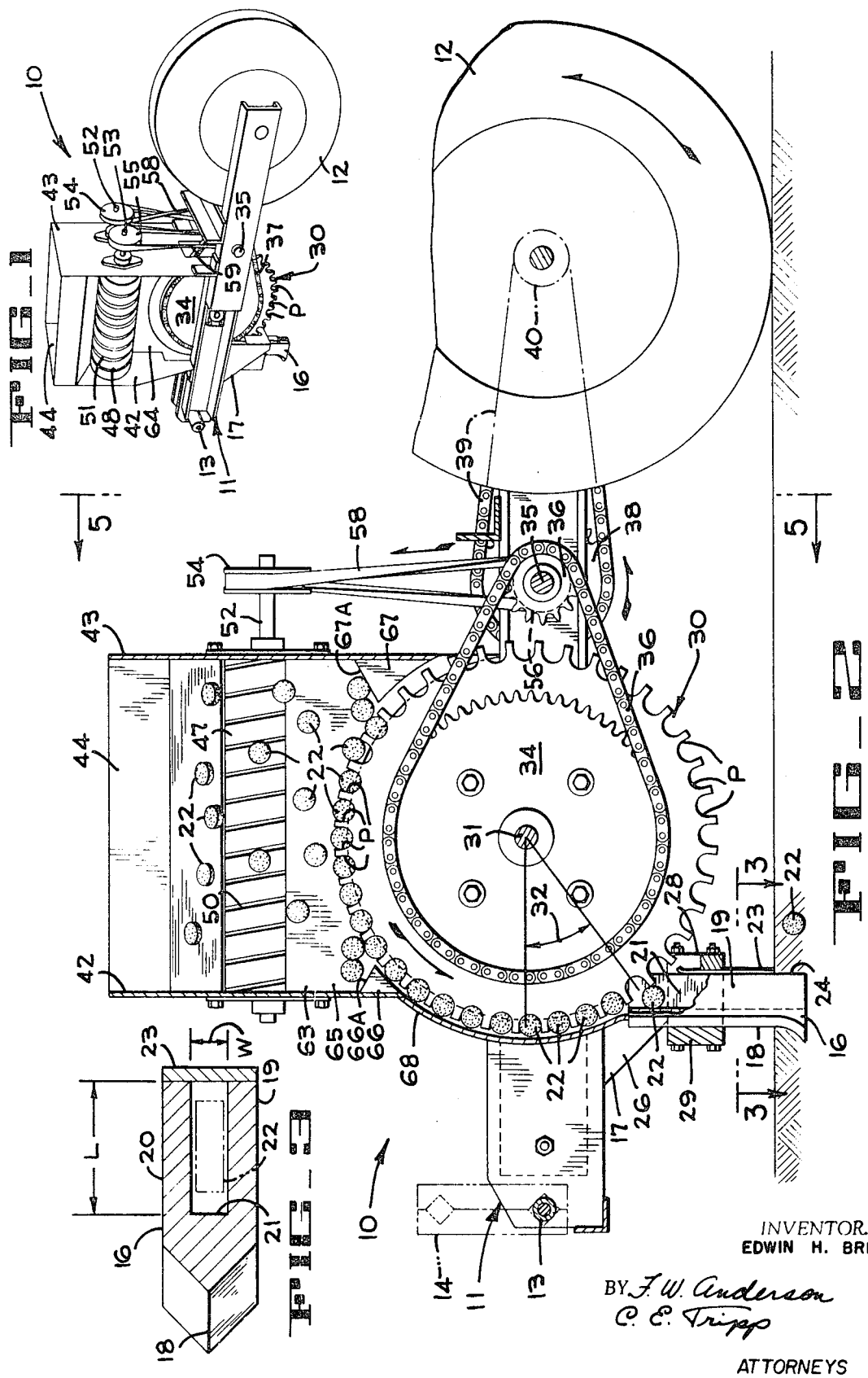

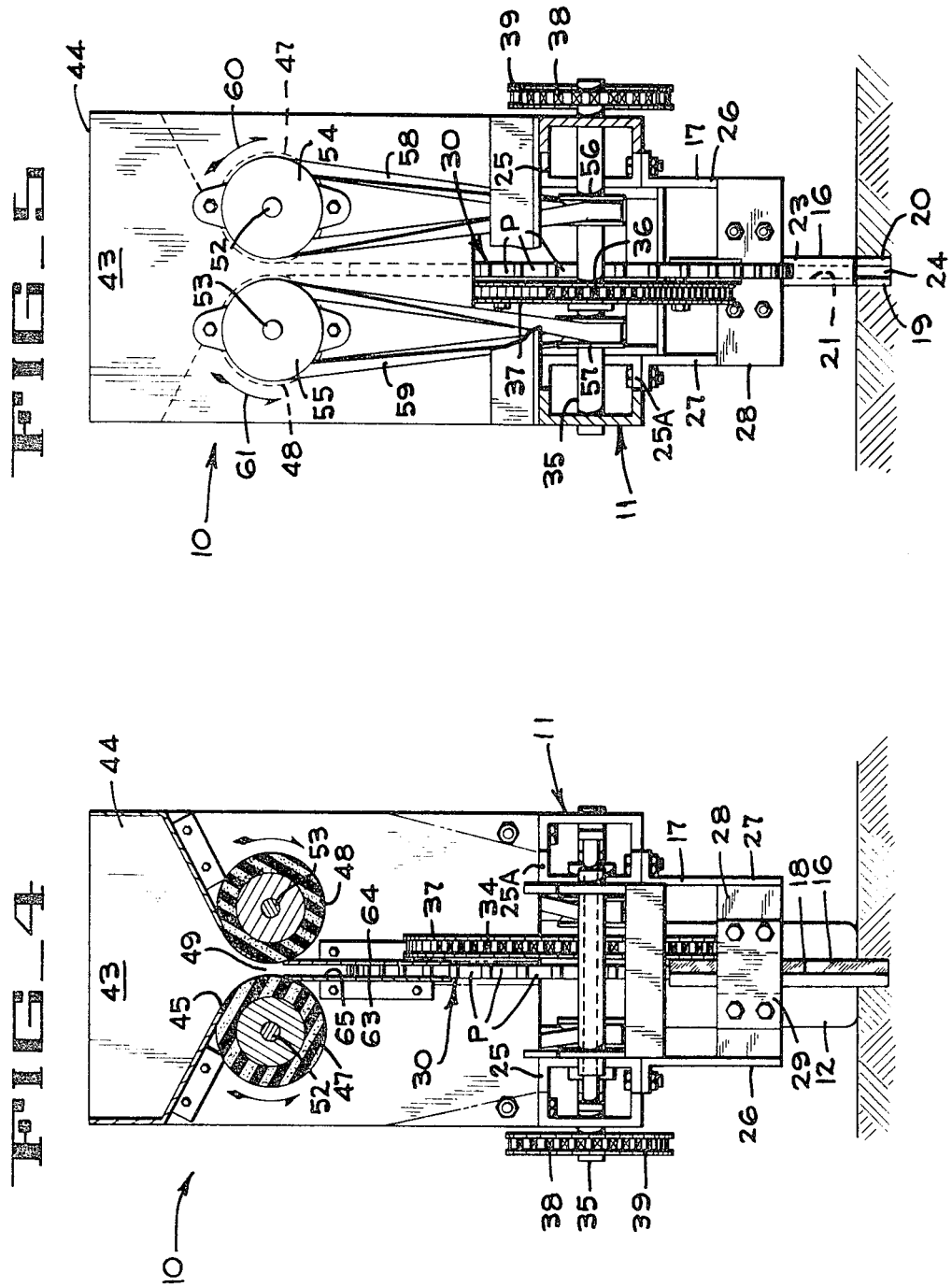

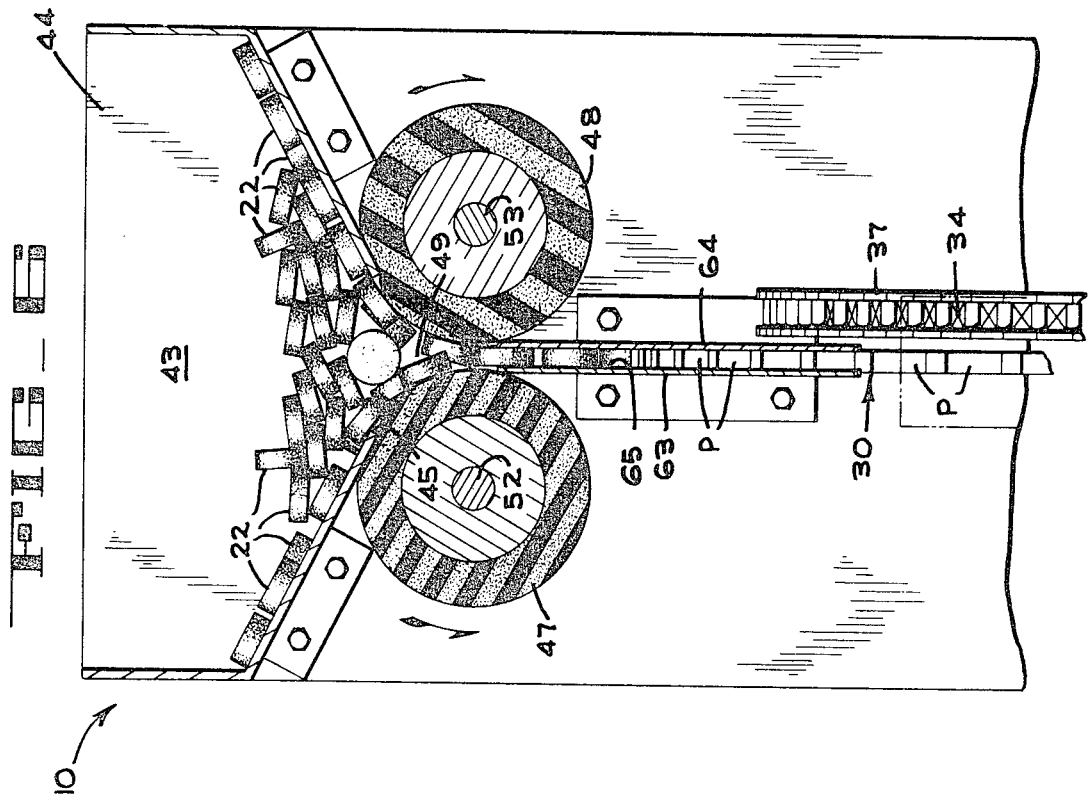
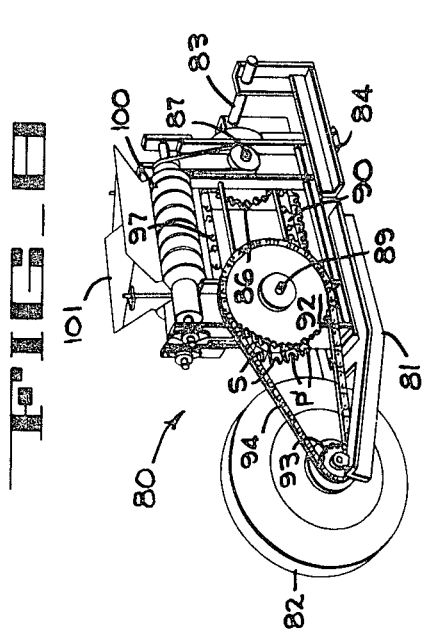
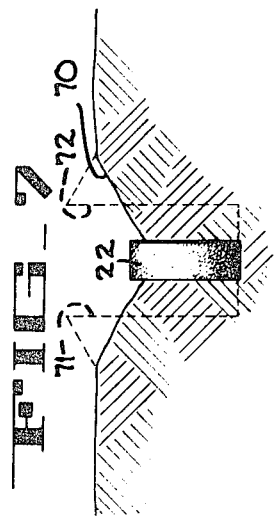
INVENTOR.
EDWIN H. BRINK
BY F. W. Anderson
C. E. Tripp
ATTORNEYS

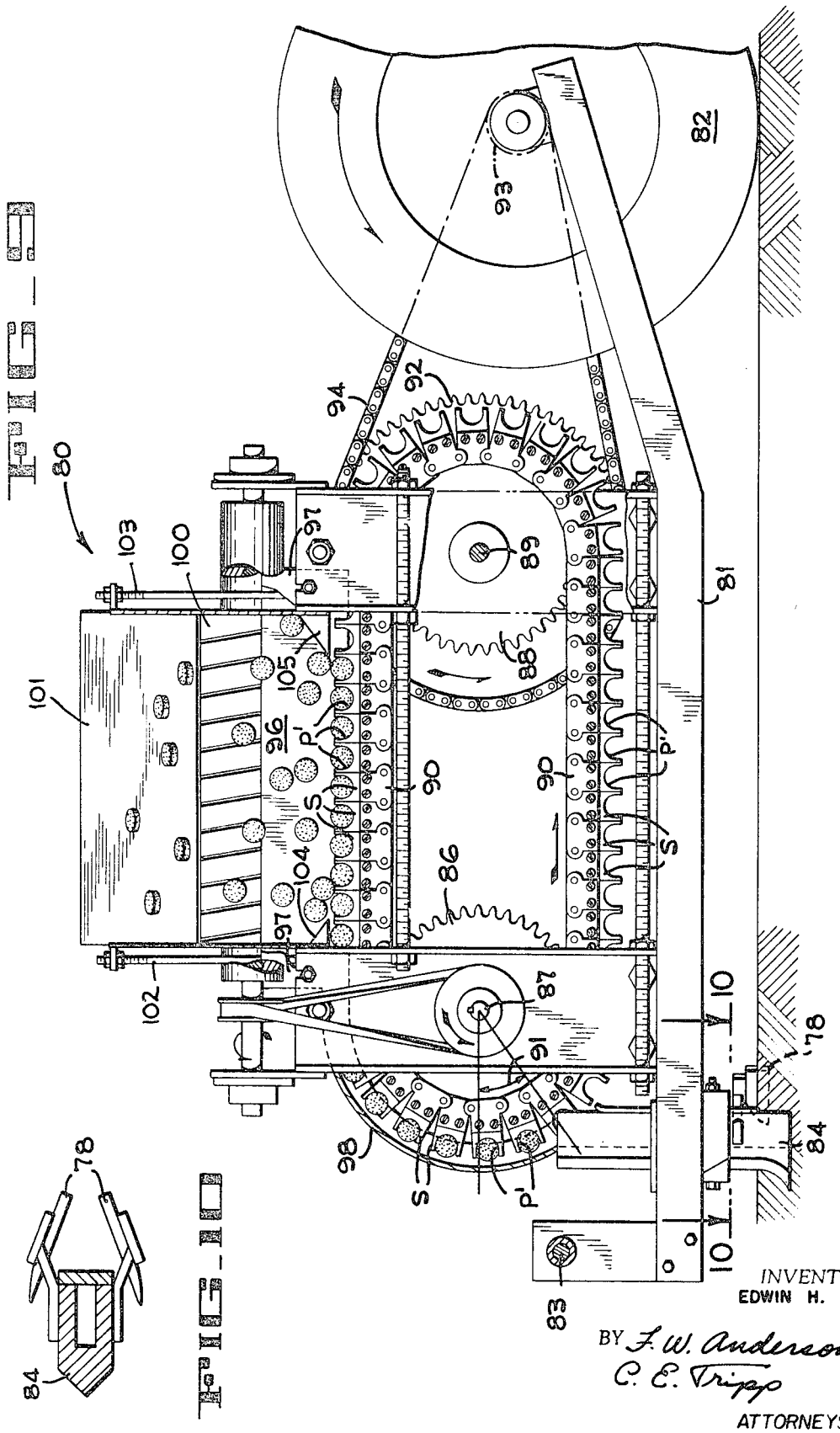

APPARATUS FOR PRECISION PLANTING

BACKGROUND OF THE INVENTION

1. Field of the Invention

This invention relates to precision planting and more particularly to an apparatus for planting seeds confined within cylindrical-shaped capsules at a constant planting depth, with exact spacing between capsules, and with each capsule oriented in a uniform manner standing on its circumferential surface with both end surfaces aligned in vertical planes extending lengthwise of the furrow.

2. Description of the Prior Art

Precision planting is a technique whereby seeds are planted in a uniform growth environment to achieve consistent germination of seeds and even crop growth. By such planting, optimum land utilization is achieved with a minimum quantity of seed and labor for thinning crops and harvesting a field more than once is avoided due to even crop growth.

One form of precision planting utilizes plastic tape in which seeds are incorporated with a uniform environment of nutrients during germination. The seeds are spaced evenly along the tape to enable the plants to take root at an optimum spacing that requires no thinning. Such seed tapes are expensive and care must be taken to prevent the tapes from being blown away before the plants take root.

Another form of planting provides for opening a furrow and extruding therein a media containing fibrous mulch in gel form with plant growth nutrients and agricultural chemicals. Seeds are then deposited on the extrusion and covered by a second extrusion of the same media. This procedure requires a large amount of media that is extruded in snakelike fashion in the bottom of the furrow and it is difficult to plant seeds at exact spacing along the furrow.

Also, a known form of planting provides for coating very fine seed, such as lettuce seed, with a media that builds up the size of the seeds, enabling planting with conventional precision planters. One of the difficulties experienced with seed coatings is that the coating becomes too hard and inhibits germination of the seed.

SUMMARY OF THE INVENTION

Orientation of seed capsules is an important factor in planting. The uppermost portion of a seed capsule should be visible at soil surface when planted to prevent soil from caking over the capsule and inhibiting plant growth. Also, a minimum area of the capsule should be exposed at the soil surface to prevent portions of the capsule from being washed away during irrigation. Furthermore, the seed capsule should be located at a depth sufficiently below the soil surface for the root system developed after germination of the seed to stabilize the plant. By positioning cylindrical shaped capsules to stand upon their circumferential surfaces on the bottom of a furrow, the above conditions can be met. Thus, a maximum rate of plant emergence is obtained after planting cylindrical-shaped capsules oriented in the above-described manner.

The planter of the present invention provides for aligning and singulating fragile seed capsules without jamming and breakage. An important feature resides in capsule aligning rollers in the hopper which turn upwardly at the capsule entrance throat. These rolls gently churn the mass of capsules in the hopper until the capsules are aligned with and drop through the roll throat into the underlying pockets of a singulating rotor. The latter drops the capsules one by one into the planting chute.

The present invention enables large quantities of seed capsules to be planted rapidly in single file along a furrow at a constant depth therein, with exact spacing between capsules and with each capsule oriented to stand on its circumferential surface. This invention utilizes the soil characteristics of a sandy soil having little cohesion for opening a furrow and closing about a capsule positioned therein to retain the capsule in place at exact spacing. Since the capsules are spaced at the desired plant spacing and a favorable germination environment is provided by the capsule, the resulting emergence is to a desired plant stand. A minimum amount of seed is used and no thinning of excess plants is required.

BRIEF DESCRIPTION OF THE DRAWING

FIG. 1 is a perspective view of a seed capsule planter embodying a form of the present invention.

FIG. 2 is a longitudinal section of the seed capsule planter shown in FIG. 1.

FIG. 3 is an enlarged section taken on the line 3—3 of FIG. 2.

FIG. 4 is a front view of the seed capsule planter shown in FIG. 1 with the front plate of the capsule hopper and guide cover removed.

FIG. 5 is a vertical section taken on the line 5—5 of FIG. 2.

FIG. 6 is an enlarged transverse section of the capsule hopper and aligning rolls with seed capsules positioned therein.

FIG. 7 is a section of a furrow illustrating a seed capsule planted therein.

FIG. 8 is a perspective view of a modified form of seed capsule planter.

FIG. 9 is a side elevation view of the seed capsule planter shown in FIG. 8 with portions broken away to show underlying structure.

FIG. 10 is a fragmentary enlarged section taken on line 10—10 of FIG. 9.

DESCRIPTION OF THE PREFERRED EMBODIMENT

With reference to FIG. 1 of the drawing, a seed capsule planter 10 is shown having a frame 11 that is adapted for earth traversing movement. A ground-engaging wheel 12 is mounted for rotation at the rearward end of the frame, while a drawbar 13 is provided at the forward end thereof for coupling with a tractor tool bar, not shown. A typical coupling member 14, shown in phantom line in FIG. 2, may be used to connect the drawbar with the tractor tool bar.

A plow 16 is suspended from the frame by a mounting bracket 17. The plow has a sharpened leading edge 18, shown in FIGS. 2 and 3, that is disposed in a vertical plane; and a pair of spaced sidewalls 19 and 20 extend rearwardly throughout the full height of the plow defining a chute 21 therebetween. This chute has a length L that is slightly longer than the diameter of a cylindrical-shaped seed capsule 22, indicated therein in phantom line, and a width W slightly wider than the distance between end surfaces of the seed capsule. In one embodiment each seed capsule has a diameter of approximately three-quarter inch and a thickness of one-quarter inch. Thus, it will be seen that the size of the chute in relationship to the seed capsule maintains the orientation of the capsule within the chute. Seed capsules of this type form the subject matter of the U.S. Pat. to Adams No. 3,561,159, issued Feb. 9, 1971 and assigned to the FMC Corporation. A backplate 23 fits against the sidewalls to enclose the rear portion of the chute and the lowermost portion of the backplate is spaced approximately 1 inch above the bottom of the sidewalls, leaving an opening 24 at the rear of the chute.

Mounting bracket 17 has a pair of upper outwardly turned flanges, shown in FIGS. 4 and 5, that are bolted to the lowermost flange of forward channel members 25 and 25A of the frame 11. A pair of side panels 26 and 27 extend downward from the outwardly turned flanges and are joined together along a lower rear portion thereof by a rear panel 28. Backplate 23 of the plow 16 abuts against rear panel 28 of the mounting bracket, and an adjustable front plate 29, which has a notch adapted to receive the sharpened leading edge 18 of the plow, is bolted to the backplate to hold the plow rigidly in position therebetween.

A rotor 30, shown in FIG. 2, is keyed on a shaft 31 that is journaled in bearings mounted the frame 11. This rotor is fabricated from a circular plate, and the periphery of the rotor is serrated forming a plurality of pockets P about the circumference thereof. Each pocket is sized to hold one seed capsule therein, thus singulating the seed capsules with the capsule extending in the plane of rotation of the rotor. The rotor is aligned for the periphery thereof to pass through the upper portion of chute 21, and each pocket P comes into communication with the chute when a radial line from the pocket to the center of shaft 31 is downwardly inclined from horizontal at an angle 32 that is between 30 and 45 degrees. This downward slope, together with centrifugal force, dislodges seed capsules from the pockets to fall down into the chute, and it has been found that an angle of approximately 32 degrees provides the most satisfactory falling characteristics.

Rotor 30 is driven by a sprocket 34 that is concentric with shaft 31 and bolted to the side of the rotor 30. A drive shaft 35 extends transversely of frame 11 between the rotor and the ground-engaging wheel 12 and is journaled for rotation thereon. A drive sprocket 36 is fixed to the drive shaft 35 and a drive chain 37 is trained about the drive sprocket and around sprocket 34 for transmitting rotation thereto. The drive shaft is driven by a sprocket 38 keyed thereto and a drive chain 39 that is trained about sprocket 38 and a drive sprocket 40 mounted for rotation with the ground-engaging wheel.

The sprocket teeth ratios together with the circumference of the ground engaging wheel 12 and the number of pockets P in the rotor 30 determine the spacing at which seed capsules are deposited. For example, if 12-inch spacing between capsules is desired and there are 40 pockets around the circumference of the rotor, while the ground-engaging wheel has a 50-inch circumference, then the sprocket ratio should reduce the rotation of the rotor to five forty-eighths of the rotation of the ground-engaging wheel. A suitable sprocket arrangement for such a reduction would provide 10 teeth on drive sprocket 40, 24 teeth on sprocket 38, 15 teeth on drive sprocket 36 and 60 teeth on sprocket 34.

While rotor 30 serves as means for inserting seed capsules into chute 21, it is necessary to feed seed capsules to the rotor so oriented that they will fit within the pockets P and at a rate sufficient to fill each pocket before delivery to the chute. Means for orienting and feeding seed capsules to the rotor are mounted on the frame above the rotor. A front plate 42 and a back plate 43 are mounted by means of angles to stand upright on frame 11 and extend transversely thereof. A pair of sidewalls, which extend between upper portions of the front and back panels to form a hopper 44, slope downwardly and inwardly to an open bottom 45, shown in FIG. 4. The downward slope of the lower sidewall portions should be at least 30 degrees from the horizontal to insure proper flow of seed capsules to the open bottom of the hopper.

A pair of aligning rolls 47 and 48 are positioned on opposite sides of the open bottom 45 with the roll surfaces being tangent to the lower sidewall portions and defining a narrow slot 49 therebetween which has a width greater than the distance between end surfaces of a cylindrical seed capsule but less than the diameter of the capsule. The aligning rolls are made of a soft resilient material such as flexible urethane foam. A helical groove 50 (FIG. 2) is provided in the surface of each roll to extend longitudinally of aligning roll 47, while a helical groove 51 (FIG. 1) is provided in the surface and extends longitudinally of the aligning roll 48. These helical grooves tend to apply a turning force to seed capsules aligned transversely of the aligning rolls.

Aligning rolls 47 and 48 are mounted on axial shafts 52 and 53, respectively, as shown in FIG. 4. These shafts are rotatably journaled in bearings mounted on front plate 42 and backplate 43 and extend outward from the backplate. A pulley wheel 54 is shown in FIG. 5 mounted on that portion of axial shaft 52 extending outward from the backplate, while a pulley wheel 55 is mounted on the outward extending portion of axial shaft 53. A pair of drive pulleys 56 and 57 are mounted on drive shaft 35 and a drive belt 58 is trained about pulley wheel 54 and drive pulley 56, while a drive belt 59 is trained about pulley wheel 55 and drive pulley 57. It will be noted that drive belt 58 is reversed from drive belt 59 so that aligning roll 57 is driven in the direction indicated by arrow 60, while aligning roll 48 is driven in the direction indicated by arrow 61. Thus, the aligning roll surfaces adjacent slot 49 turn upward and tend to push seed capsules, not aligned with the slot, upwardly back into hopper 44. Only seed capsules aligned so that the diameter of the capsule extends longitudinally of the slot and in a generally vertical plane can pass between the aligning rolls.

A pair of vertical panels 63 and 64 extend between front plate 42 and backplate 43, at a spacing equal to slot 49, from between aligning rolls 47 and 48 to opposite sides of the upper peripheral portion of rotor 30. These vertical panels define a chamber 65 through which seed capsules move downward by gravity and are maintained in vertical alignment as they travel from the slot 49 to the pockets P of the rotor. A deflector 66, shown in FIG. 2, is fixed to the front plate within the chamber immediately above the rotor, filling the space between the panels 63 and 64 and having an inclined surface 66A to deflect seed capsules not seated within a pocket P to move upward in the chamber. Similarly, a deflector 67 is fixed to the backplate within the chamber immediately above the rotor and is provided with an inclined surface 67A to direct seed capsules towards empty pockets in the rotor coming into communication with the chamber. The vertical panels extend downward, forwardly of the front plate, to the plow 16, and a curved guide cover 68 joins the vertical panels. Thus, the peripheral portion of the rotor is enclosed from the chamber 65 to the plow chute 21, and seed capsules are retained in the pockets by the guide cover.

To operate the seed capsule planter 10, a quantity of seed capsules 22 are placed in the hopper 44, as shown in FIG. 6. Gravity forces the seed capsules to the open bottom 45 of the hopper and the aligning rolls 47 and 48 orient the capsules to fall through the slot 49 to chamber 65. There the capsules are retained until they fall into a pocket P of rotor 30, which carries the capsule to plow chute 21. As previously explained, the rotor turns in relationship to the rotation of the ground-engaging wheel 12 so that intervals between capsules dropping into the plow chute provides exact spacing between capsules along the bottom of the furrow.

As the seed capsule planter 10 moves through a field to be planted, plow 16 opens a rectangular furrow 70, as shown in FIG. 7. Soil swells upward on each side of the plow and sidewalls 19 and 20 of the plow retain sides 71 and 72 of the furrow in an upstanding position, as indicated in phantom line. A seed capsule 22 falls through chute 21 and is deposited on the bottom of the furrow. As the plow moves forward, the seed capsule stays in position passing through opening 24 at the rear of the chute. The plow sidewalls then release the sides of the furrow to assume the natural angle of repose of the soil and slide inward engaging the end surfaces of the seed capsule. Then, as ground-engaging wheel 12 passes over the furrow, it acts as a press wheel applying a surcharge to the soil on each side of the furrow, which causes further lateral soil movement to fill the furrow. Should it be desired to plant in soil having a high degree of internal cohesion, scrapers 78 (FIG. 10) could be positioned behind the flow to force soil laterally against the capsule.

A modified form 80 of seed capsule planter is shown in FIGS. 8 and 9. Frame 81 has a ground-engaging wheel 82 rotatably mounted at one end thereof, while a drawbar 83 is provided at the opposite end for coupling with a tractor tool bar, not shown. A plow 84 is suspended from the frame and has a construction similar to plow 16, previously described. A chute is positioned behind the plow for depositing seed capsules on the bottom of a furrow opened by the plow.

Means for inserting seed capsules into the chute behind plow 84 will now be described. A first sprocket wheel 86 is keyed to on a shaft 87, rotatably journaled within upright portions of the frame. A second sprocket wheel 88 is keyed to a shaft 89, journaled within upright portions of the frame that are spaced rearwardly from the first sprocket wheel. A sprocket chain 90 is trained about the first and second sprocket wheels and each link of the sprocket chain has a saddle S connected thereto facing outward from the sprocket wheels. A pocket P' is provided in each saddle to hold one seed capsule with the diameter of the capsule aligned in the plane of rotation of the sprocket chain. The first sprocket wheel is positioned so that the saddles pass through the upper portion of the chute behind plow 84, and the pockets P' come into communication with the chute at an angle 91, downwardly inclined from horizontal at approximately 32 degrees.

A driven sprocket 92 is keyed to shaft 89 and a drive sprocket 93 is fixed for rotation with the ground-engaging wheel 82. Sprocket chain 94 is trained about the driven and drive sprockets so that shaft 89 is driven in relationship to rotation of the ground-engaging wheel and second sprocket wheel 88 rotates with shaft 89, driving sprocket chain 90 and first sprocket wheel 86. The ratio of sprocket teeth between the drive and driven sprockets can be adjusted to establish the spacing at which seed capsules are deposited.

A pair of vertical panels 96 and 97 are spaced on opposite sides of saddles S that project upward from the upper run of sprocket chain 90 and define a chamber thereabove. Portions of the side panels extend forward and downward in an arcuate path to plow 84 and are connected by a guide cover 98 that retains seed capsules within the saddle pockets P' as the sprocket chain 90 rotates about the first sprocket wheel 86 to the plow chute. These vertical panels are suspended from upright portions of the frame 81.

An aligning roll 100 and a similar aligning roll, not shown, are spaced on opposite sides above the vertical panels 96 and 97 defining a slot therebetween that is directly above the chamber between vertical panels. An open bottom hopper 101 is supported above the aligning rolls by bolts 102 and 103 that are pivotably mounted between the vertical panels. Front and back portions of the hopper extend downward between aligning rolls limiting ends of the chamber between vertical panels and supporting deflectors 104 and 105. The aligning rolls are rotatably mounted and adapted to be driven in opposite directions in response to revolution of sprocket chain 90.

Operation of seed capsule planter 80 is similar to that previously described for seed capsule planter 10. The basic distinction between the planters being that planter 10 has a rotor 30 for singulating, spacing and transferring seed capsules from the hopper 44 to plow chute 21, while planter 80 has a sprocket chain 90 with a multiplicity of outward facing saddles S having pockets P' therein to convey seed capsules to the plow chute. The primary advantage of the sprocket chain is that it can more readily be adapted for planting seed capsules at short spacing intervals.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. A planter for the precision planting of relatively thin, disclike seed capsules formed of fragile material comprising a frame, means for advancing the frame along the ground; a hopper on said frame having V-bottom walls forming a capsule discharge throat parallel to the direction of planter advance; laterally spaced capsule aligning rolls beneath said hopper having opposed, upwardly turning surfaces that form tangential continuations of said V-bottom hopper walls; closely spaced, generally parallel capsule guide panels depending from a zone within and between lower portions of said rolls and having front and rear edge walls, said roll and panel spacings being just slightly wider than the thickness of the disclike capsules; a vertically disposed rotor element projecting into the space between said panels and having radial single pockets for receiving capsules from between said panels; a planting chute having sidewalls that flank said rotor element and form depending continuations of said guide panels and with the upper end of said chute being open to a lower, downwardly turning portion of said rotor element; and means for synchronously rotating said rotor element and said planter frame advancing means.

2. The planter of claim 1, said rotor element being positioned relative to the chute so that each rotor pocket comes into communication with the upper end of said chute when the radius line of said pocket is downwardly inclined from the horizontal by an angle in the range of about 30°–45°.

3. The planter of claim 1, wherein said aligning rolls comprise soft, resilient material, each roll having a peripheral helical groove extending longitudinally thereof to apply longitudinal forces to capsules positioned transversely of the roll throat and thereby align the capsules longitudinally of the throat.

4. The planter of claim 1, wherein the front and rear edge walls of said guide panels are provided with downwardly inclined deflectors sloping toward said rotor element.

5. The planter of claim 1, wherein said rotor element is a disc.

6. The planter of claim 1, wherein said rotor element includes a sprocket chain, a multiplicity of saddles fixed to said sprocket chain at equal spacing therealong with a pocket formed in each saddle shaped to hold a single seed capsule therein, and spaced sprocket chain wheels rotatably mounted on said frame for driving said chain.

* * * * *